United States Patent

[11] 3,575,447

| [72] | Inventor | Ralph H. Merkle |
| | | Brighton, Mich. |
| [21] | Appl. No. | 809,747 |
| [22] | Filed | Mar. 24, 1969 |
| [45] | Patented | Apr. 20, 1971 |
| [73] | Assignee | General Motors Corporation |
| | | Detroit, Mich. |

[54] TUBE FITTING
4 Claims, 3 Drawing Figs.

[52] U.S. Cl. .................................................. 285/248,
285/258
[51] Int. Cl. ...................................................... F16l 33/20
[50] Field of Search ........................................... 285/248,
256, 259, 93, 258

[56] References Cited
UNITED STATES PATENTS
2,230,115  1/1941  Kreidel ..................... 285/248

| 2,685,458 | 8/1954 | Shaw ............................... | 285/259X |
| 2,686,066 | 8/1954 | Paquin ........................... | 285/93 |
| 3,463,517 | 8/1969 | Courtot et al. ................. | 285/93 |

FOREIGN PATENTS

| 839,730 | 6/1960 | Great Britain ................. | 285/259 |

Primary Examiner—Dave W. Arola
Attorneys—Paul Fitzpatrick and E. W. Christen

ABSTRACT: A fitting, particularly suited for use with nylon and other polymer tubing for air brake systems and the like, comprises a coupling insert with an externally ridges insert portion extending into the tube and a coupling portion extending from the end of the tube; an internally ridged sleeve tightly enclosing the tube around the insert portion and having one end bearing against a shoulder on the coupling portion; and a nut bearing against the other end of the sleeve and threaded to engage a fitting to which the coupling portion is removably connected. The insert portion is expanded to fix the fitting permanently on the tubing.

Patented April 20, 1971

3,575,447

INVENTOR.
Ralph H. Merkle

BY
Paul Fitzpatrick
ATTORNEY

TUBE FITTING

My invention is directed to an improved fitting for plastic tubing, particularly nylon tubing adapted for use with relatively high-pressure systems such as airbrake systems for motor vehicles.

It has long been common practice in the truck and coach industry to provide vehicles with airbrakes, and to use copper tubing to conduct the air under pressure between the compressor, reservoir, valve, and fittings on the chassis which connect to the brakes on the vehicle axle. It has been realized that substantial economies could be made, both in cost of the installation and weight of the vehicle, by using suitable nylon or other plastic tubing instead of copper tubing. Standards have been adopted for tubing for this purpose, the appropriate standard for sort of tubing for which my fitting is initially and primarily intended being nylon tubing type 3 according to Society of Automotive Engineers Technical Report J844$b$, Copyright 1968, for the 1969 SAE handbook.

General use of the nylon tubing, however, has had to await the arrival of a suitable fitting by which the ends of the tubing can be connected to the various elements of the system. Obviously, in a system such as a vehicle brake system, the utmost reliability is essential. Therefore, the fitting to attach the nylon tubing must be extremely reliable in the sense that it will retain the tubing against pressure, tension, or vibration. It is desirable that the strength of the joint between the fitting and tubing be substantially equal to that of the tubing so that any tensile force which would pull the tubing from the fitting would be sufficient to part the tubing. In addition, the fitting to be suitable for commercial use must be reasonable in cost and sufficiently easy to attach. Preferably, it should be such as to conform to other components of the system so that the plastic tubing with the fittings is substitutable for the previous copper tubing with its fittings without other changes in the system. Also, so that in the event of repairs to a vehicle equipped with plastic tubing, metal tubing, which is more readily available in the field, can be substituted for the plastic.

The principal objects of my invention are to provide a tube fitting particularly suited to airbrake installations, to provide a tube fitting which is extremely reliable and is moderate in cost and readily installed, to provide a fitting suited for nylon or other polymer tubing and one which has a pulloff strength equal to the tensile strength of the tubing, to provide a fitting which has exceptional strength to resist bending fatigue, to minimize flow restriction in the fitting, to minimize possibility of improper assembly, to provide a fitting in which nut torque is not critical, and to provide a tube fitting which may be removed and replaced numerous times because there is no rubbing contact against the tubing in coupling the fitting to a mating fitting.

In general, to attain these objects, my tube fitting in its preferred embodiment comprises a coupling insert which connects with a mating fitting and which fits into the end of the tube. It also includes a sleeve which extends over the outside of the end of the tube and encloses the tubing between it and the insert, the tubing being compressed between these two parts, preferably by expansion of the insert. It further includes a nut which encloses the sleeve and part of the coupling insert, the nut bearing against the sleeve which in turn bears against a shoulder on the insert to hold it against the mating fitting.

It is, of course, known to provide a hose end or the like of a type in which the end of the hose is retained between an insert and an outer sleeve and in which means are provided to couple these parts to a mating fitting. Examples of disclosures of such may be found in U.S. Pat. to White, No. 170,457, Nov. 30, 1875; to Dick et al., No. 1,759,224, May 20, 1930; to Loughead, No. 1,928,836, Oct. 3, 1933; to Miller, No. 2,146,756, Feb. 14, 1939; and to Scholtes, No. 2,228,018, Jan. 7, 1941. However, as will be seen from the succeeding detailed description of the preferred embodiment of my invention, it involves novel and desirable combinations of structure not present in any of prior disclosures of which I am aware.

While my invention may be embodied in various structures incorporating the principles of the invention, the nature of the invention and the preferred mode of accomplishing it may be ascertained by reference to the succeeding specification and the accompanying drawings of the preferred embodiment of the invention.

Figure 1:
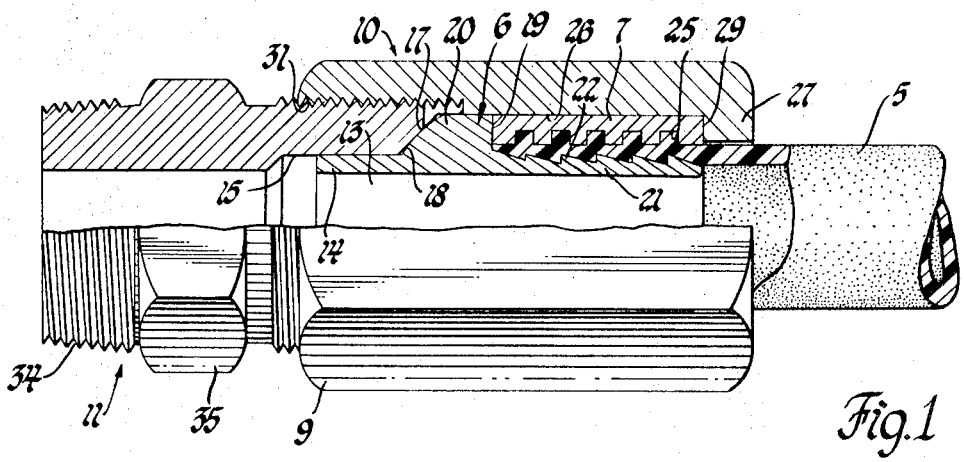
FIG. 1 is a view, with parts cut away and in section, of a tube fitting according to my invention united to the end of a plastic tubing and coupled to a mating fitting of conventional type.

Referring first to FIG. 1, the parts there shown are a length of reinforced nylon tubing 5, a coupling member 6, a sleeve 7, and a nut 9. The coupling member, sleeve, and nut constitute a tube fitting 10. This is adapted to connect the tube removably to any suitable mating fitting such as the conventional threaded fitting 11.

Figure 2:
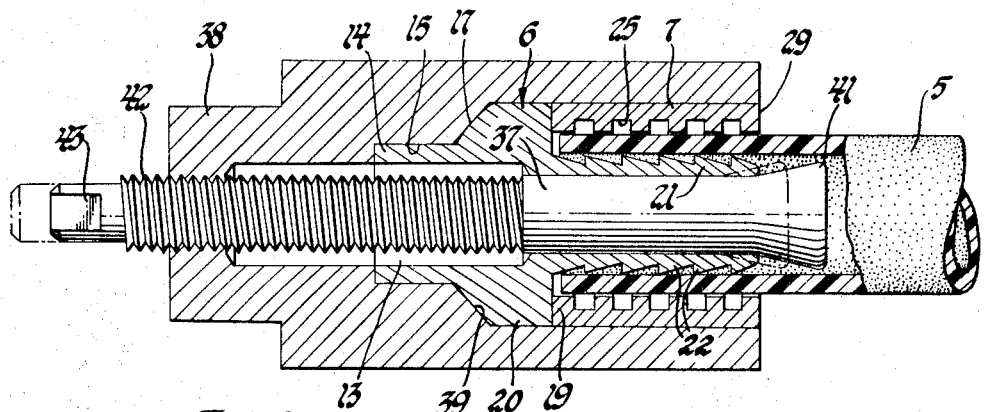
FIG. 2 is a longitudinal sectional view illustrating one method of fixing the fitting to the end of the tube.
Figure 3:
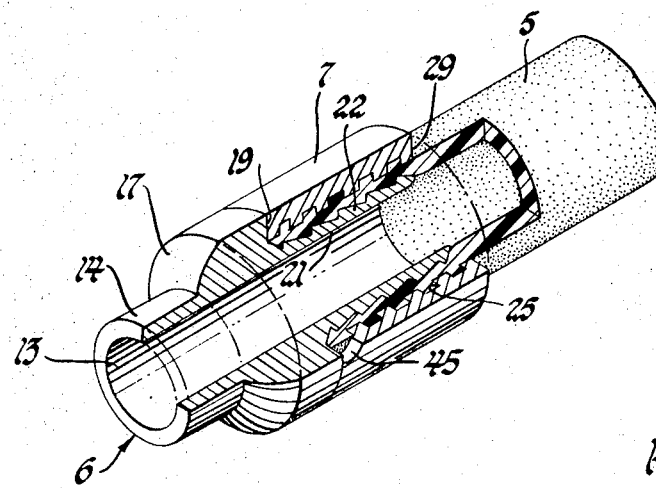
FIG. 3 is an axonometric view, with parts cut away and in section, showing parts of the fitting compressively engaging the tubing.

FIG. 2 illustrates the tube 5, coupling member 6, and sleeve 7 before the coupling member has been expanded to compress the end of the tube between the coupling member and sleeve.

The coupling member is of annular form and defines a conduit 13 extending from end to end of the member, an aligning pilot 14 adapted to extend into the bore 15 of the mating fitting, a part spherical seat 17 adapted to engage the conical seat 18 on the mating end, and a radial shoulder 19. The portion of the coupling member to the left of shoulder 19 as illustrated may be called the coupling portion 20 of the coupling member. The coupling member also includes an insert portion formed with serrations 22 according to common practice, these serrations having radial faces toward the shoulder 19 and easily sloping conical surfaces directed away from shoulder 19. The insert portion, which is integral with the coupling portion, is initially of outside diameter preferably approximately 0.01 inch less than the inside diameter of tubing 5. This initial condition is illustrated in FIG. 2.

The sleeve 7 has a cylindrical outer surface and an inner surface provided with a number of circumferential grooves or recesses 25. Sleeve 7 preferably has an inside diameter about 0.01 inch larger than the standard outside diameter of the tubing and preferably has about five grooves, 25 of rectangular cross section. Serrations 22 and grooves 25 are small and shallow; they are exaggerated in the drawing for clarity.

The nut 9 has an exterior surface adapted for engagement with a wrench, preferably a body of hexagonal cross section. The nut has a cylindrical bore 26 adapted for a rotating fit on the exterior of sleeve 7 and includes an inwardly directed flange 27 having a radial face adapted to engage the end 29 of the sleeve 7. Nut 9 has internal threads 31 to engage threads on the mating fitting so that the nut can be tightened up to pull the flange 27 against sleeve 7 and sleeve 7 against shoulder 19, and thus press seat 17 against seat 18. Of course, nut 9 could engage fitting 11 by any other suitable device such, for example, as a bayonet lock, but threads are preferred.

The details of the exemplary mating fitting 11 are immaterial to this invention. It includes a portion threaded to engage nut 9, a portion with tapered or pipe threads 34, and a hexahedral portion 35 by which it may be screwed into any other element of the system.

The parts 6, 7, 9, and 11 are preferably of any suitable metal such as copper alloy or stainless steel. The tubing 5 which is preferred for the installation is according to 1969 SAE Standard J844$b$ and is known as Type 3. Such tubing consists of a core extrusion of 100 percent virgin nylon (polyamide) containing additives which provide heat resistance. This core is reinforced with polyester braid or equivalent, followed by a protective covering (jacket) of 100 percent virgin nylon (polyamide) containing additives which provide heat and light resistance. The protective coating is adequately bonded to the core through the interstices of the braid. The braid is omitted in the ¼ inch tubing, which is a small size.

A method of assembling the tube fitting to the tube is illustrated in FIG. 2. First nut 9 and then sleeve 7 are slipped over the end of the tube and the coupling member 6 is inserted into the tube substantially abutting shoulder 19 against the tube and with the sleeve 7 abutting shoulder 19. A swaging or expanding mandrel 37 lies within the coupling member 6 at this time and the coupling member and ring are retained within a jig 38 which provides a seat at 39 for the coupling member. The mandrel includes a tapering head 41 and a threaded stem 42 terminating in a noncircular end portion 43 which may be engaged by a suitable wrench or motor to draw the mandrel to the left, as illustrated in FIG. 2, through the insert portion 21 which it expands or swages. The swaging apparatus shown in FIG. 2 requires a minimum of machinery and might be employed by repairmen on the job. As will be apparent from prior art such as that mentioned above in this specification, many types of machinery may be employed for swaging the insert portion 21 so as to expand the hose radially and squeeze it tightly into the grooves in the insert portion and sleeve. This engagement of the hose with the two parts retains the sleeve on the tube and the insert in the tube.

Preferably the swaging outward of the insert portion is of sufficient extent that the interior diameter of this portion constituting part of the conduit 13 is the same as or substantially as great as the inside diameter of the tube so that there is no restriction of flow at this fitting.

The jig 38 and mandrel 37 are removed after the swaging operation and then the nut 9 is moved into engagement with the end 29 of sleeve 7. The tube fitting is then complete and ready to attach the tube to any part of a brake or other fluid system by threading the nut onto the mating fitting or other threaded part so as to engage the seat 17 against the mating fitting.

Preferably, two notches 45 are provided in the end of sleeve 7 which engages shoulder 19. These notches, 180° apart, provide for visual inspection to make certain the tube is fully inserted into the fitting.

Reference in the foregoing description to vehicle brake systems is not intended in any limiting sense as the fitting is suitable for other purposes. Also, the brake systems of vehicles may also include means for supplying air under pressure to other devices such as transmission shifters, windshield wipers, and air horns.

Laboratory tests and tests with vehicle installations of high-pressure air systems for airbrakes and accompanying devices have demonstrated the practicability and cost saving possibilities of the airbrake systems incorporating nylon tubing and my improved tube fitting. It appears that the saving in cost of the airbrake plumbing of a vehicle would be approximately one-third as compared to that when copper tubing is used.

The foregoing description of the preferred embodiment of the invention for the purpose of explaining the principles thereof is not to be construed in a limiting sense, as many modifications may be made by the exercise of skill in the art within the scope of the invention.

I claim:

1. A tube fitting comprising, in combination, an annular coupling member defining a conduit extending from end to end of the member, defining a coupling portion at one end of the member adapted to couple for fluid transmission to a mating fitting, defining an insert portion at the other end of the member adapted to extend into a tube, and defining a shoulder between the said portions facing the said other end; a generally cylindrical sleeve abutting the said shoulder and enclosing the insert portion, the sleeve and insert portion defining between them an annular space closed at one end by the said shoulder to receive the end of the tube, the tube being compressively retained by and between the insert and sleeve within the said space by deformation of at least one of the insert and sleeve to diminish the radial dimension of the said space; and a nut rotatably mounted on the sleeve with a flange engaging the end of the sleeve remote from the said shoulder and extending over the sleeve and at least partially over the coupling portion, the nut being configured to secure the tube fitting to a said mating fitting and press the sleeve against the coupling portion and the coupling portion against the said mating fitting.

2. A fitting as recited in claim 1 in combination with a tube retained between the sleeve and insert.

3. A combination as recited in claim 2 in which the outer surface of the insert and the inner surface of the sleeve have surface relief engaging the tube to enhance retention of the tube.

4. A fitting as recited in claim 1 in which the fitting is dimensioned relative to the tube for expansion of the insert portion to an interior diameter substantially equal to the interior diameter of the tube for retention of the tube.